United States Patent
Brummett et al.

[15] 3,690,478
[45] *Sept. 12, 1972

[54] APPARATUS AND METHOD FOR CONVEYING AND SORTING NON-UNIFORM ARTICLES IN AND INTRA-FACTORY SYSTEMS

[72] Inventors: Paul L. Brummett; Sigmund G. Isley, both of Smithfield, N.C.

[73] Assignee: Amerel Company, Inc., Smithfield, N.C.

[ * ] Notice: The portion of the term of this patent subsequent to Dec. 14, 1988, has been disclaimed.

[22] Filed: Nov. 8, 1971

[21] Appl. No.: 196,611

Related U.S. Application Data

[62] Division of Ser. No. 35,179, May 6, 1970, Pat. No. 3,627,153.

[52] U.S. Cl. ............................................. 214/16.4 R
[51] Int. Cl. ................................................. B65g 1/06
[58] Field of Search ............... 214/16 B, 16.4 R, 11 R; 198/38

[56] References Cited

UNITED STATES PATENTS

| | | | |
|---|---|---|---|
| 2,832,297 | 4/1958 | Daniels | 214/16 B |
| 2,947,407 | 8/1960 | Wood | 214/16 B |
| 2,997,133 | 8/1961 | Gehrke | 214/16 B |
| 3,002,635 | 10/1961 | Holland | 214/16 B |
| 3,149,736 | 9/1964 | Austin et al. | 214/16.4 R |
| 3,207,262 | 9/1965 | Berman | 186/16 |
| 3,448,870 | 10/1969 | Gallo et al. | 214/16 B |
| 3,563,479 | 2/1971 | Brouwer et al. | 242/35.5 |

*Primary Examiner*—Gerald M. Forlenza
*Assistant Examiner*—Raymond B. Johnson
*Attorney*—B. B. Olive

[57] ABSTRACT

An intra-factory system and method provides a semi-automated means for conveying, temporarily storing and segregating non-uniform articles which may be textile articles such as coats, dresses, blouses, shirts, piece goods and the like or other non-uniform articles such as tires, filled cartons and the like. A closed loop, continuously moving, coding type, chain conveyor which operates at lower loading levels and higher pick-off levels codes the articles and circulates past loading, temporary vertical bin storage, labelling and shipping stations. Storage is provided by a plural group of vertical storage bins having storage rods which for each bin can be selectively positioned either locally at the bin or remotely at a master console. The articles are picked off the conveyor automatically and by gravity slide are directed to selected bins where they are temporarily stored and from which they are returned and recoded on the same conveyor for transfer to and pick-off at selected labelling or shipping stations.

4 Claims, 17 Drawing Figures

PATENTED SEP 12 1972

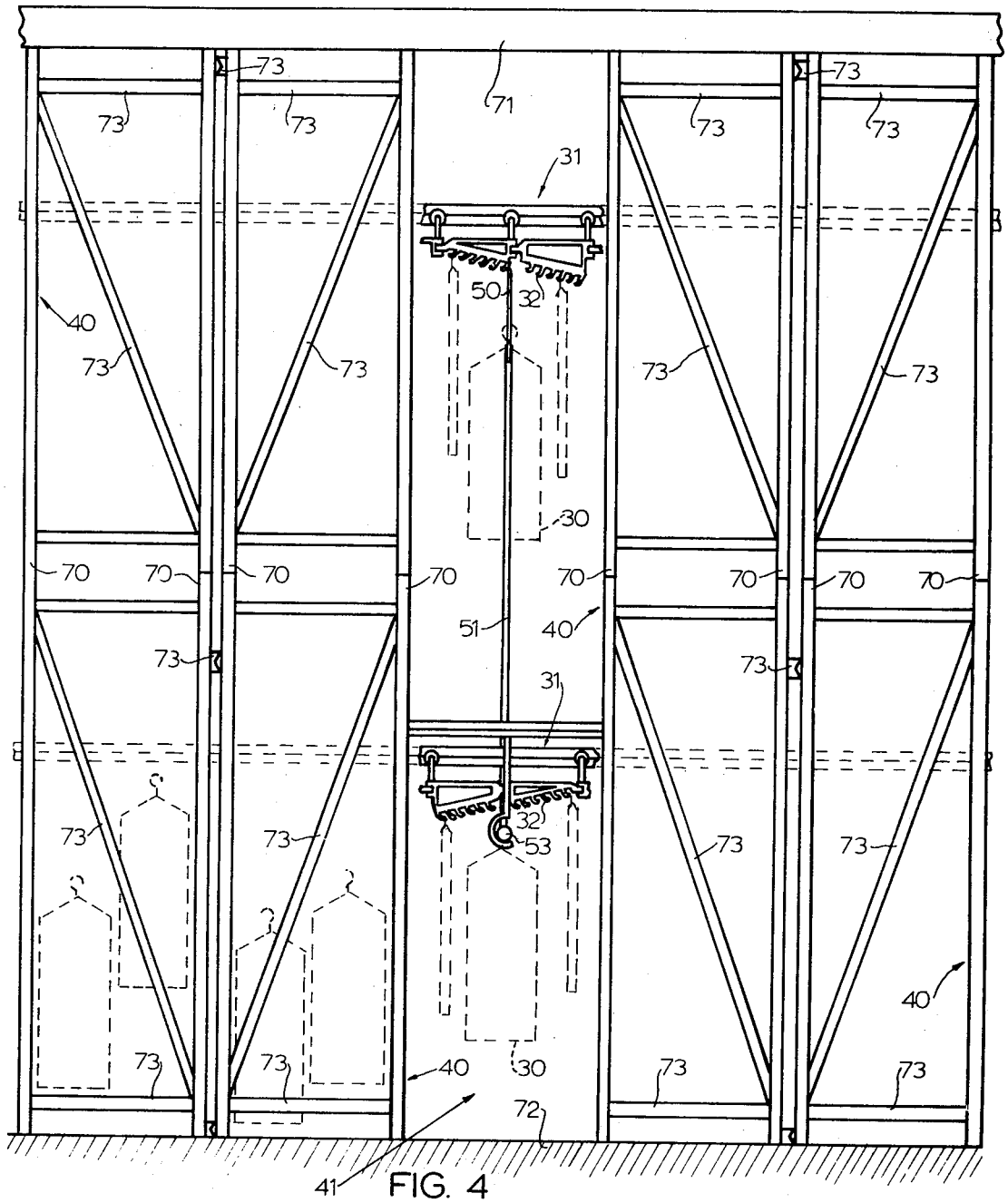
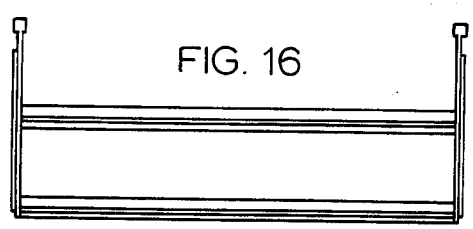
FIG. 16
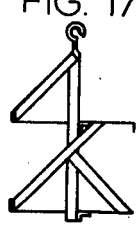
FIG. 17

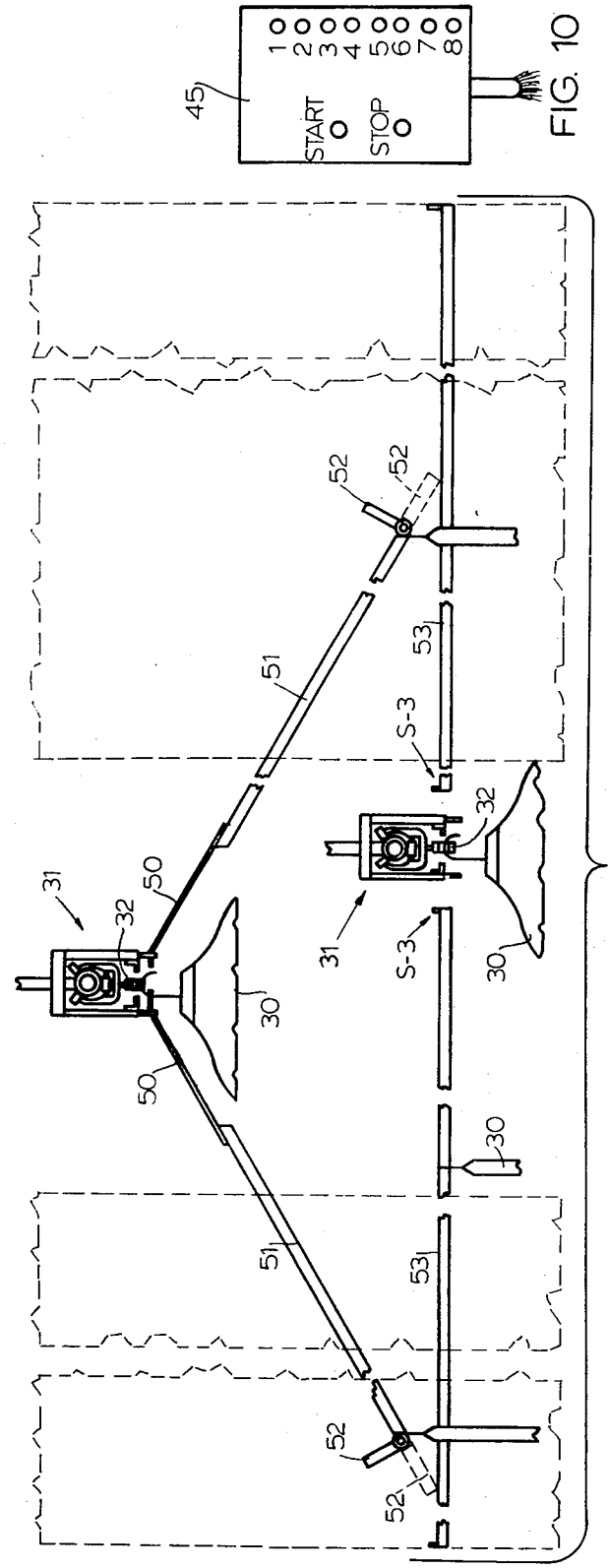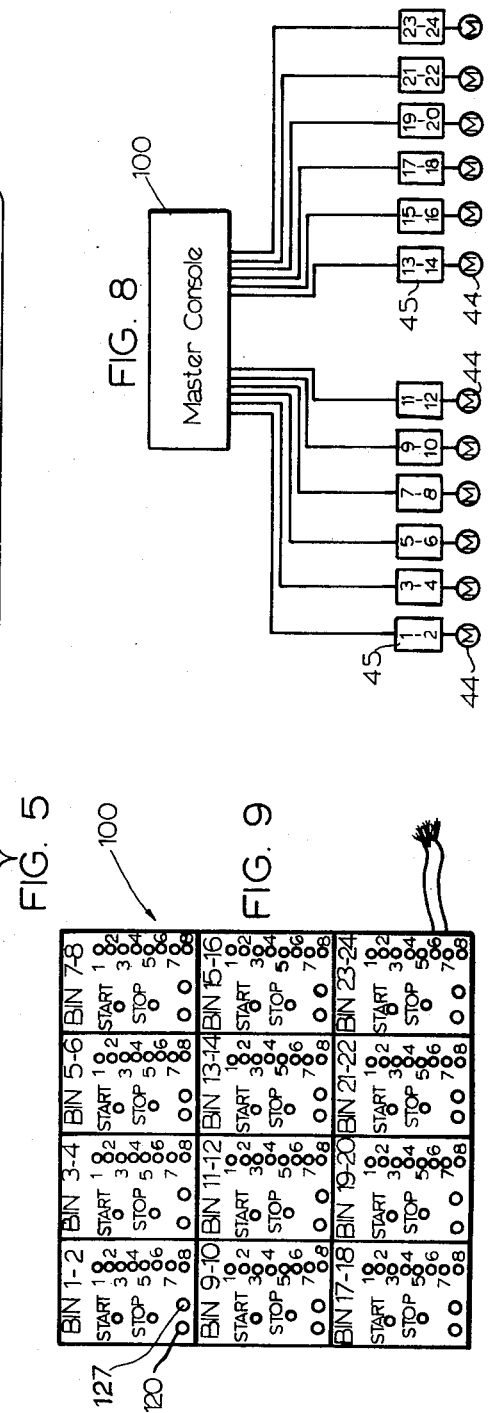

APPARATUS AND METHOD FOR CONVEYING AND SORTING NON-UNIFORM ARTICLES IN AND INTRA-FACTORY SYSTEMS

CROSS-REFERENCE TO RELATED APPLICATION

This application is a division of copending application Ser. No. 35,179, filed May 6, 1970, now U.S. Pat. No. 3,627,153 granted Dec. 14, 1971 under the same title.

BACKGROUND OF THE INVENTION

1. Field of the Invention

The invention relates to methods and systems for conveying and segregating articles, to conveyor systems and to apparatus for temporarily storing articles between operations.

2. Description of the Prior Art

Using garment conveying, storing and segregation as an example, there have been two basic systems or methods, static and moving for storing and handling garments between final packaging and shipping. The more popular method is to hand carry garments after final packaging and hang the garments on horizontal rods, tubes, pipes, etc. segregated by color, size and style. Such horizontal storage members are supported in a number of different methods, the frequency of support being a function of the intended loading factor and the maximum allowed deflection of the horizontal member. As the garments are needed for filling orders they are removed from the storage members and hand carried to a shipping station.

The other basic equipment method is a moving system which is based on using a slow but continuously moving overhead horizontal conveyor loop, which provides the necessary temporary storage and continuously moves the garments between the packaging and shipping stations. In some applications the loop of conveyor chain moves in planes of different elevation.

In a static system two horizontal storage lines, i.e., pipes or tubes, are placed parallel to each other with only sufficient clearance between the two lines to hang and store two products, i.e., dresses, coats, etc., side by side. Aisle space must be established on both sides of the unit just described. When considering the normal application of banks of units of two lines each, then an aisle serves basically for only two lines of product. As an example, using a horizontal dimension per garment, on a hanger, as 24 inches, then two garments side by side will require 48 inches, plus whatever dimension is to be allowed for aisles. If an aisle of 48 inches is to be used, then the total linear measurement for two garment lines, side by side, would be 96 inches. Thus, there is poor space utilization.

Under the static system, it is of course possible to have more than one level of horizontal lines in the same vertical plane. Good engineering design would indicate however that the maximum desirable vertical reach for the average human is 75 inches to 76 inches from the floor. See "Human Engineering Guide For Equipment Designers" by Wesley E. Woodson, University of California Press (1954). Therefore, if an average garment on a hanger height is taken as 36 inches, then the maximum allowable number of levels that would fall within the desired 75 inch range would be only two. It is possible under the static equipment system to utilize full ceiling height to determine the number of levels of garments to be hung. However, in order for the operator to be able to use all levels above the 75 inch height auxiliary equipment, i.e., steps, catwalks, moving and rising platforms, etc., are required. Furthermore, whatever design the auxiliary equipment takes, substantial operating time is required to utilize the levels above the 75 inch height.

An advantage of the moving system is that the moving system offers an opportunity for better floor space utilization in that a greater density of product per square foot of floor space can be accomplished when a single level form of operation is being considered. This type of equipment, however, does not readily lend itself for multi-level operations. Although a single loop, horizontal conveyor type, can go up to other horizontal planes, the positioning of one level on top of another level of a single loop system is not a practicality. Therefore, the moving conveyor system has a poor potential for space utilization as it does not lend itself to use of height, and is expensive on a per linear foot cost basis.

Use of single vertical storage bins has been proposed for garment display as in U.S. Pat. No. 2,155,583. However, such bins have not been employed in plural groups and utilized with a coding type conveyor in a coordinated system and method practical for conveying, storing, labelling and shipping operations within a manufacturing plant.

Non-uniform articles such as garments which leave the packaging station thus need to be sorted out according to style, color and size, need to be temporarily stored in the interim and need to be ultimately picked from storage and transferred to shipping to fill orders. Where the same garment is sold under different labels it has been recognized that such garments should be stored unlabelled since this drastically reduces inventory costs. However, the conventional systems have not utilized grouped bins, make poor use of space, are not adapted to multi-level storage, require substantial operator walking, lifting and hand carrying and have made no provision for delayed labelling to save inventory costs.

SUMMARY OF THE INVENTION

The invention embodiment shown provides a system and method for handling non-uniform garments between packaging and shipping operations, with alternate labelling prior to shipping. Packaged garments are introduced into the system either by being hung on hangers or flat folded and placed in pans which hangers or pans are in turn suspended from hooks on a Railex coding type conveyor. The operator at the packaging station effectively classifies each garment for an ultimate point of discharge at a selected temporary storage bay. The operator decisions include deciding the position of the hanger hook on the conveyor hook, i.e., right or left, and a separate decision as to the particular hook level. A Railex conveyor may have twelve hooks in each set. With 12 conveyor hooks, for example, each at a different level there are 24 possible choices for classifying by style or color or size or bay destination.

After the garments have been placed on the conveyor according to a selected code they then travel for some predetermined distance at some relatively low level, say 7 feet. The conveyor then rises to a much higher level of say 20 feet. At the high level the conveyor passes along a central aisle between groups of temporary storage stations. At each bay between opposed bin groups the operator has accessible a group of vertical storage racks which consists of endless chains having garment support bars and an electric drive and push button control which allows the operator to bring selected bars to a loading position. Thinking of the space between four such storage bins as constituting a "bay" each bay has a device for picking-off hung garments at a particular conveyor hook level and according to how the hanger hook faces, right or left, on that conveyor hook level. Thus garments are picked-off in a right and left direction toward opposite bays at essentially the same station. Garments moving to the right can be of a certain style and those to the left of another style. Alternatively the garments could be picked-off by color or size. After the garments are picked off they glide under the influence of gravity on a downwardly sloping slide bar which may take the form of a straight bar on the form of a helical bar which terminates at a lower level, say 7 feet, substantially midway between opposed storage bins. This bar provides temporary storage for a number of garments destined to be stored on a particular bar of a particular storage bin in a particular bay.

Operations in the bay of course require both picking of garments from vertical storage for shipping as well as transfer to vertical storage for storage pending shipping. In the embodiment disclosed all of the bin controls are collected at a remote master console and each pair of bins are controlled by a common control circuit. Thus, 24 bins involve 12 control circuits at the master console. An operator may push appropriate control buttons at the master console for several bin pairs and during the time required for the selected bin bars to move into position the operator may move to the bin where he starts work. The duplicate control located on each respective bin pair allows on-site selection and also overrides and signals the master console in the event two operators, one at the bin itself and one at the console happen to need to select the same bin at the same time. The system allows operators to be constantly loading storage bars as well as picking garments off the bars to fill orders. The picked garments are placed on a horizontal slide bar which provides additional temporary storage and the garments are moved back towards and transferred back to the same coding conveyor on which they arrived but at the lower level, say 7 feet. Because of the convenience of the system, the same operator who loads garments onto the storage bars and picks garments off the bars may also be responsible for putting the picked garments back onto the conveyor for transfer to selected shipping stations.

When garments are placed on the conveyor for shipping purposes they are "coded" according to a particular shipping station and this in turn is determined by orders. For example, one hundred garments headed for customer A might all be directed to shipping station No. 1. The next order for any 25 garments might be directed to shipping station No. 2 for customer B. These would be garments that were labelled prior to storage and are ready for shipping. Alternatively, if the garments are stored unlabelled the orders may go to labelling station L-1, for example, then to shipping.

Once the garments are back on the conveyor and are headed for a shipping or labelling station the conveyor rises again to a substantially higher level, say 20 feet. At each labelling and shipping station there is a downwardly sloping slide bar with means for picking off the pre-coded garments and directing these garments to a substantially lower level, say 7 feet. The terminal end of the slide bar at this lower level is at the particular selected labelling or shipping station. An inclined "speed rail" connects the labelling and shipping stations and the operators pack the labelled garments for shipping in the usual way.

Thus, the object of the invention is to provide a method and system for handling with a single coding conveyor non-uniform articles requiring, as in the example of garments, coded conveying, coded storage, coded retrieval and further coded conveying between stations with maximum space utilization, minimum plant investment, and minimum physical demands on the operators in a partially automated system adapted to many kinds of non-uniform articles.

BRIEF DESCRIPTION OF DRAWINGS

FIG. 4 is an end elevation view of the framework comprising a storage bin group with the drive mechanism not shown and also illustrating the high level supply and pick-off, the downwardly sloping pick-off bar and the low level outgoing conveyor.

FIG. 5 is an enlarged fragmentary view of the high level pick-off, the downwardly sloping pick-off bar and the low level outgoing conveyor.

FIG. 8 is a block diagram of the circuitry between the bin controls located at the respective bins and the bin controls at the master console.

FIG. 9 is a diagram of the master console.

FIG. 10 is a diagram of the type bin control which is located at the bin.

FIG. 16 is a side elevation view of a storage shelf unit adapted for use in the storage bins for folded garments.

FIG. 17 is an end view of the FIG. 16 shelf unit.

DESCRIPTION OF THE PREFERRED EMBODIMENT

Figure 2:
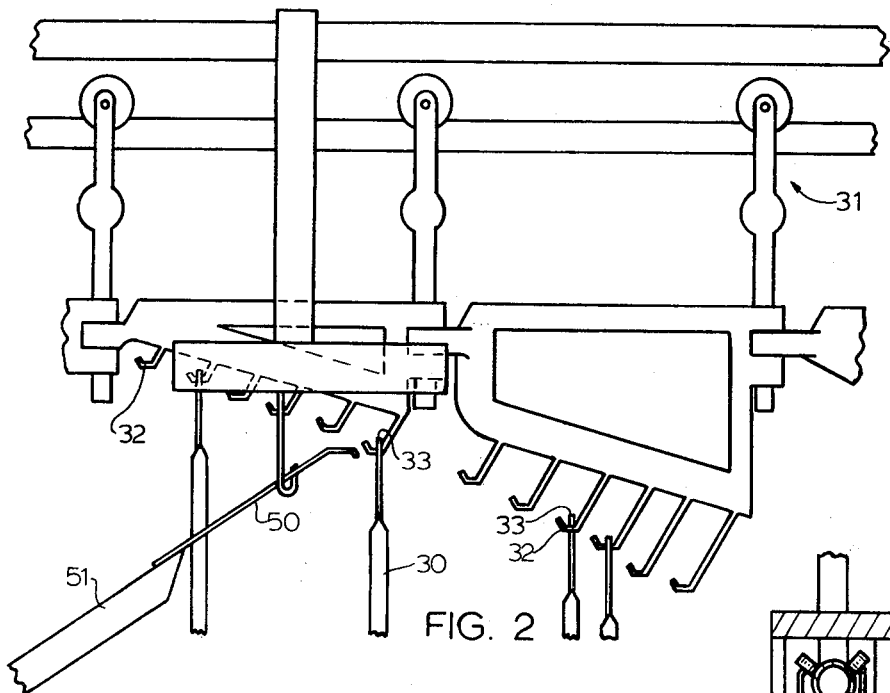
FIG. 2 is a fragmentary side elevation view of the Railex type conveyor and illustrating how garments are placed and picked off.
Figure 3:
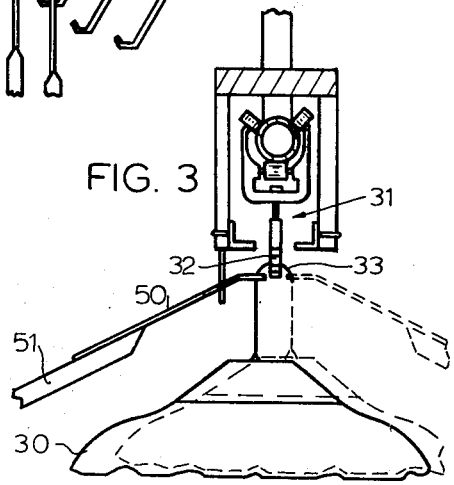
FIG. 3 is an end elevation view of the FIG. 2 apparatus but on a reduced scale.

A general description of the overall system as applied to garments will first be given in reference to FIG. 1. Packaged garments 30 are introduced into the system at a first station(s) labelled S-1, and are hung on endless conveyor 31 by means of sets of hanger supports 32. Conveyor 31 and hanger supports 32 may be of the Railex type made by the Railex Corporation of Queens, N. Y. As shown in more detail in FIG. 2 the individual garment hangers can be placed on the conveyor hangers at different levels by means of the hooks 33. It will also be seen that in the example of FIG. 2 the sequence repeats for each 12 such hooks although larger systems would use large sequences. Furthermore by hanging the garment hangers so that hooks 33 are oriented to the right or to the left (see (FIG. 3) the hangers can be picked off endless conveyor 31 either to the right or to the left. Thus with 12 levels in each set the garments can be "coded" at station(s) S-1 according to 24 choices. Stated differently the operator at station(s) S-1 places each garment on endless conveyor 31 according to where it is to be picked-off at the next station labelled S-2. For example, assume that the manufacturer is manufacturing and shipping yellow and red coats in different styles and sizes. All yellow coats, style 500, size M could for example be placed on the same conveyor hook level and oriented to the left. At station S-2, as later explained, the yellow coats would be picked-off and flow in one direction and the red coats would be picked-off and flow in an opposite direction. Another choice for the operator at either station S-1 would be to place the yellow coats on one level, oriented right, and the red coats on another level, oriented right, and this would also "code" the garments for being picked-off and routed to different destinations at station S-2 but in the same flow direction.

The Railex type conveyor is old in the art and its use is generally understood with regard to being used as a coding conveyor prior and up to finished garment storage and shipping. The system of the invention thus makes use of the same type conveyor but in operations dealing with handling the garments after finishing.

Endless conveyor 31 at stations S-1 runs at essentially operator's head level which facilitates placement and coding of the finished garments 30. After leaving stations S-1 the conveyor is directed to a substantially higher level, e.g., 20 feet, and it is at this high level that the conveyor 31 approaches the set of second station(s) S-2. The basic purpose of the operations and system at each station S-2 is to provide means for picking-off, temporarily accumulating prior to storage and temporarily storing finished garments according to some classification based on color, style and size in order that the same garments may be later retrieved for filling of orders. The system apparatus at each station S-2 also provides means for returning the garments to conveyor 31 for subsequent transfer to the shipping stations as later discussed.

Considering an individual station S-2 in more detail it will be seen that at this station there are various groups of bins 40 which are arranged side by side in groups, with a work aisle 41 between opposing bins of each group and with bin groups on each side, i.e., right and left, of conveyor 31. As later discussed in more detail, each bin 40 is of the vertical endless carrier type consisting of a pair of opposed endless chains or the like between which is supported vertically spaced, horizontal support bars 42 adapted to support the finished garments 30. Vertical storage bins of this type are shown generally in U.S. Pat. Nos. 859,425; 1,456,963; 1,542,817; 1,680,034; 2,155,583 and 2,673,780. However, so far as is known the utility and advantages of employing a plurality of such bins as a part of a coordinated, coded, conveyor, gravity slide-manual system for conveying and segregating nonuniform articles such as handling finished garments of many sizes, colors and styles between final packaging and shipping has not heretofore been recognized.

In the system of the invention each support bar 42 of each bin 40 is arbitrarily designated to receive a particular type garment classified by style, color and size. In the embodiment shown every pair of bins have at the bin location a common electrical drive motor 44 and a common control box 45, labeled as illustrated in FIG. 10. The bin controls also appear in a remote master control unit shown and later described with reference to FIGS. 8, 9 and 11. Thus, a particular support bar 42 which corresponds to a particular garment classification may be obtained by the operator pushing the appropriate control button at the bin itself or by pushing the control button at the bin itself or by pushing the control button at the remote unit all of which is later referred to in more detail.

As the coded garments arrive at the station S-2 they are picked-off by a particular picking bar 50 and by action of gravity are moved downwardly to operator's head level on guide bar 51 which terminates above and intermediate the length of the work aisle 41 of a selected bin group (see FIG. 5). Depending on the position of the latch 52 the garments may simply accumulate on guide bar 51 or slide down onto the horizontal return bar 53. In further explanation note will be taken that each bin group designated Bin-1, Bin-2, Bin-3, Bin-4 etc. through Bin-24 in FIG. 1 mates with a particular picking bar guide return bar arrangement. Thus, since each picking bar is adapted to pick-off certain coded garments and only such garments, each bin group automatically receives at the respective work aisle only selected coded garments. These may be of a certain style, color or size or combinations of the same according to the orders being processed at the time for sales and inventory.

Once the coded garments have arrived at the work aisle the operator determines by visual inspection where the garment is to be stored, that is in which bin and on which bar. He may then press the appropriate control button of the respective control box 45 at the bin itself which brings that bar into position. Thereafter, a direct manual transfer from the return bar 53 to the respective support rod 42 is effected and with essentially no walking motion at the time of transfer. Furthermore, with the system illustrated the operator may go to the master control console whose operation is later explained and select several bins simultaneously. Also, he may easily work several bins simultaneously while waiting for the support bars to position either in loading garments into the bins or in removing garments from the bins as later discussed.

The bin operator upon being directed to fill orders goes through an essentially reverse procedure in that he now pushes a control button either at the bin itself or on the master console and corresponding to a support bar having garments needed to fill an order. When such garments arrive, the operator, again with no walking motion required at the time, is able to remove the selected garments from the support bar and place them on the return bar which as shown in FIG. 5 terminates adjacent a run of endless conveyor 31 at operator's head level and the operator slides the garments to this terminal end at the third station S-3. Here the operator again "codes" the garments either for shipping at a fourth station, S-4, or for labelling at a fifth station S-5. That is, at station S-3 the operator returns the garments to conveyor 31 and if labelled, codes them according to the shipping station SS-1, SS-2, SS-3 or SS-4, and if not labelled, according to a labelling station L-1 or L-2.

After leaving station S-3, the conveyor again rises to a relatively high level, e.g., 20 feet, and at station S-4 for labelled garments, the conveyor mates with sets of picker-bars 60 and guide bar arrangements 61 similar to those previously explained with reference to the second station S-2. These later picker-bars are set to pick-off garments according to shipping station, i.e., SS-1, etc. and the picked garments slide by gravity from the high level to operator's head level and to a position proximate the selected shipping station. The picked garments then either temporarily accumulate and are stored on the particular guide bar 61 or are immediately removed from guide bar 61 and transferred to a shipping container. If the garments are unlabelled they will be picked off by a similar picker and slide bar arrangements 62, 63, directed to labelling stations, L-1, L-2, and then by an inclined trolley "speed rail" 64 to the shipping station. Each shipping station has a connecting spur track 65 and a latch 66 (Similar to FIG. 5) for diverting garments from speed rail 64.

It is contemplated that vertical bins of the present type would be best utilized in high roof buildings although certainly not limited to such structure. As seen in FIG. 4, each storage group is comprised of a number of upright structural members 70, which may be load bearing and integrally secured, e.g., by nuts and bolts or welding, to cross structural beam members 71 of the same building. Upright members 70 extend from floor 72 vertically to beams 71 and are located in predetermined arrangements to provide the framework of separate storage bins. Members 73 provide additional stability or bracing to the building and storage bins.

Figure 6:
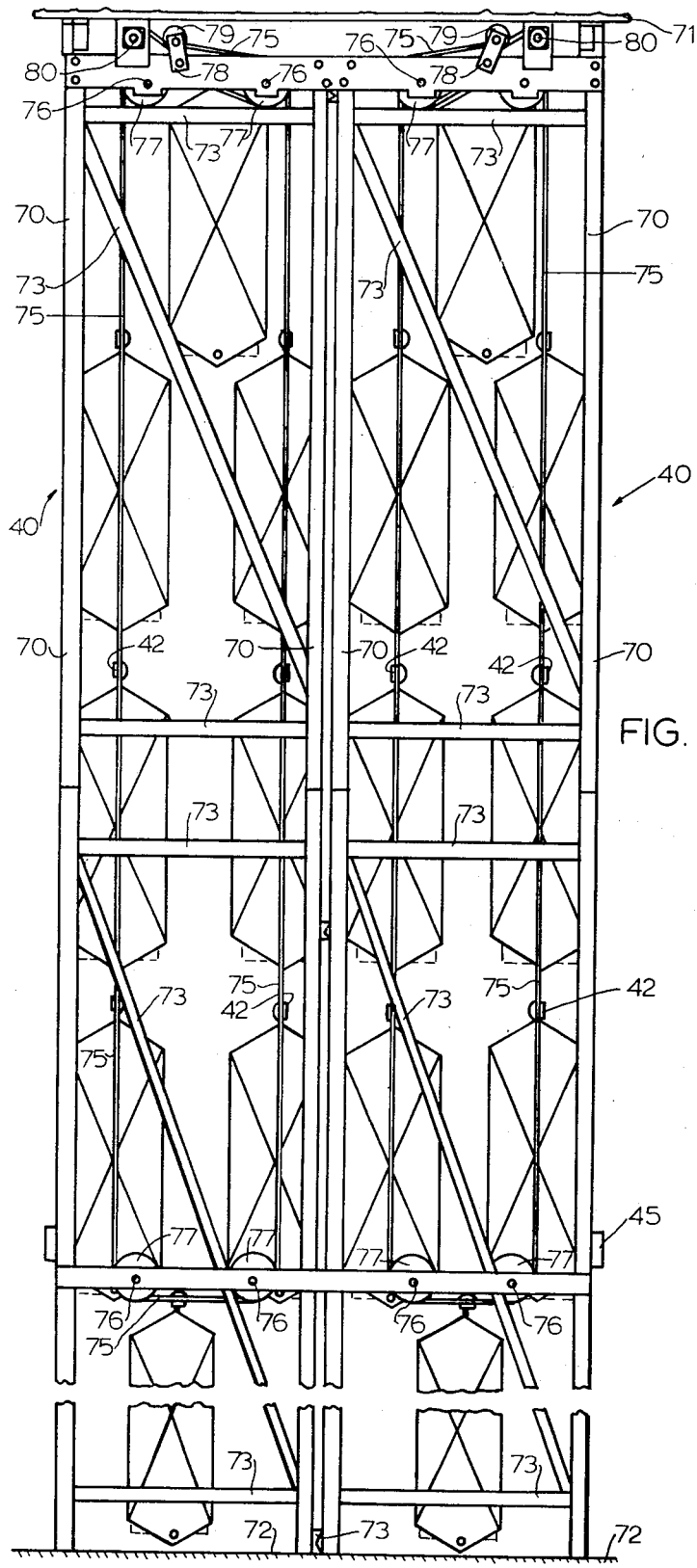
FIG. 6 is an end elevation view of one vertical storage bin group composed of several storage bins and showing the drive mechanism.
Figure 13:
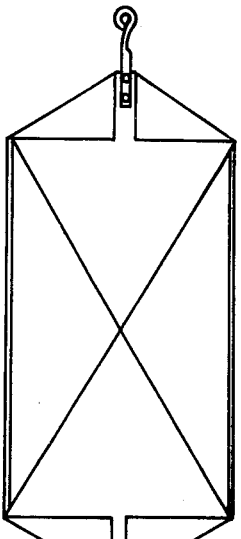
FIG. 13 is an end elevation view of a garment shield used in connection with the vertical storage bins.
Figure 14:
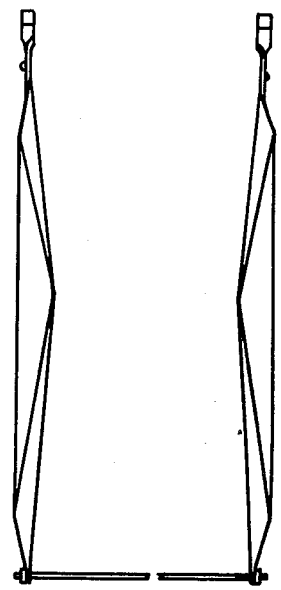
FIG. 14 is a side elevation view of the FIG. 13 device.
Figure 7:
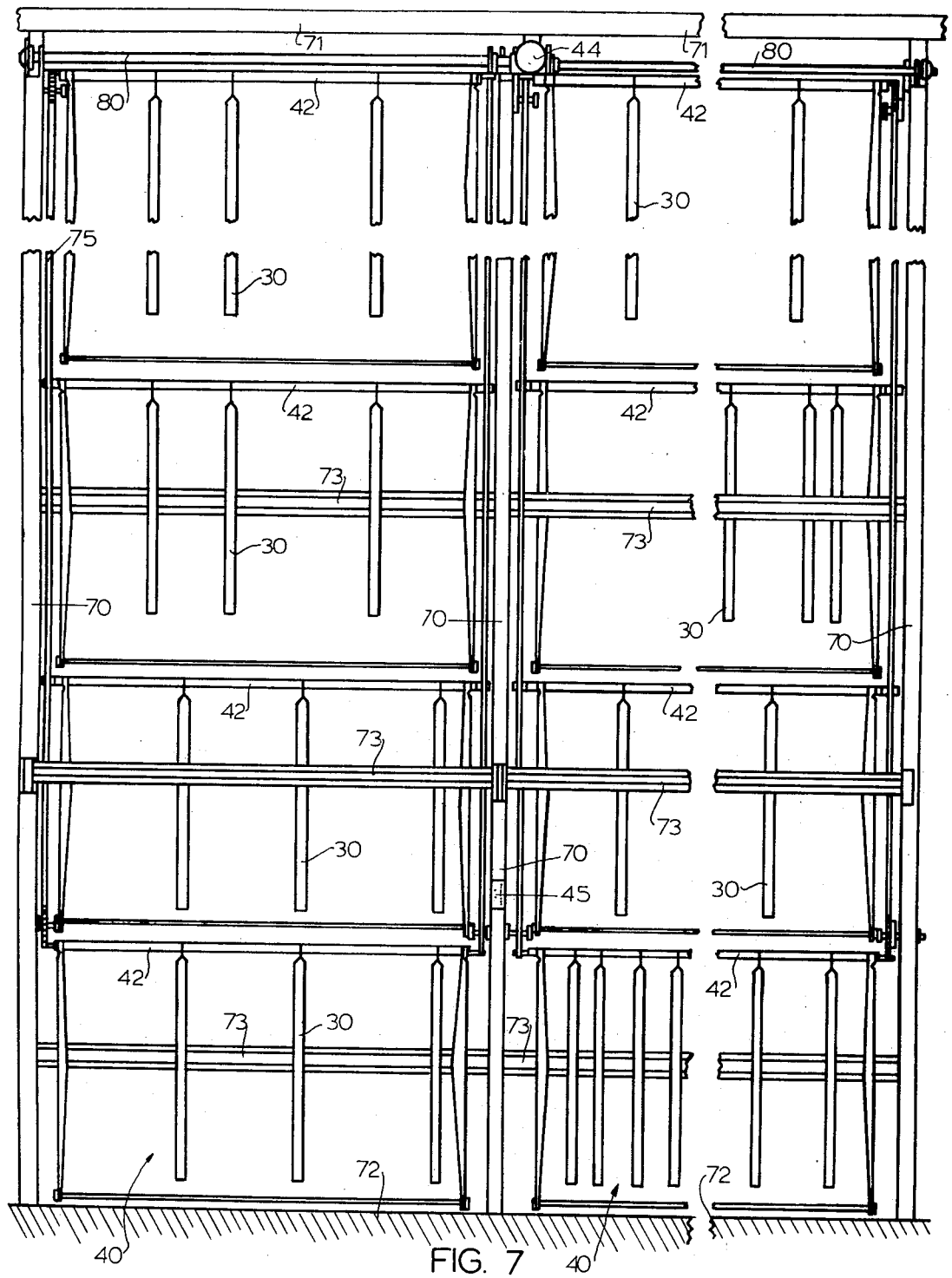
FIG. 7 is a side elevation view of the FIG. 6 apparatus.

Referring now to FIGS. 6 and 7 for discussion of the vertical storing apparatus, endless chains 75 extend vertically within the respective bins. Chains 75 are moveably secured by means of shafts 76 rotating within selected members 73. Shafts 76 have toothed gears 77 secured thereon and receive chain 75. Chain 75 may be adjusted for tightness or slack by means of adjustment of bracket 78 and gear 79 (see FIG. 6). Each chain is driven through respective shafts 80 and drive motors 44 (see FIG. 7). Motor 44 is mounted centrally of a pair of vertical bins 40 forming a bin group and shafts 80 extend outward from motor 44 and drives chains 75 of each bin 40.

Figure 12:
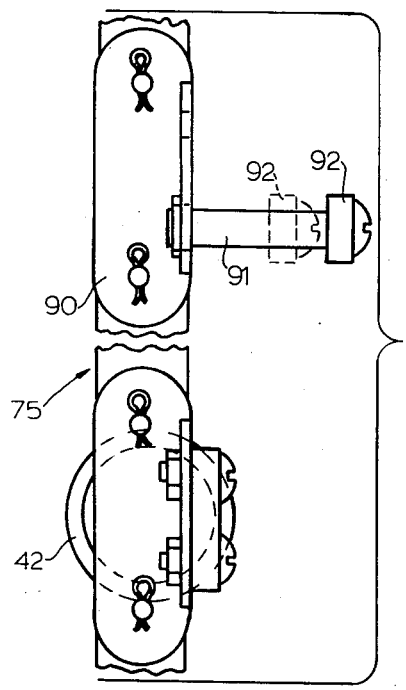
FIG. 12 is an enlarged fragmentary view of a cam control used to activate various micro-switches for control of certain storage bars.

Motors 44 are regulated through control box 45 at the bin or through the duplicate control at the remote console. FIG. 12 shows enlarged the type cam control used to activate micro-switches for selecting the desired storage bar 42. Chain 75 is made up of individual links as are conventional chain drives. On certain predetermined links 90, a shaft 91 extends outward from the side of link 90. Shaft 91 has on its outer end a circular shaped disc 92 which when contacting micro-switches will activate a circuit. Shaft 91 may be of various lengths as illustrated in dashed lines. The length of shaft 91 determines which micro-switches are contacted and in turn which storage bar 42 is brought down to the operator. Once the push button bearing the number of the desired storage bar 42 is depressed, motor 44 is activated and drives chain 75 in a clockwise direction so that the desired bar 42 comes down from the top in view of the operator. Once the correct disc or cam 92 of the correct shaft 91 strikes the micro-switch controlling the desired bar 42, motor 44 is deenergized and chain 75 stops with the desired bar 42 in the proper position for the operator to reach the garments thereon. This process is repeated with each storage bar desired.

As previously mentioned the system of the invention represents a novel use of vertical storage bins by grouping a plurality of such bins in conjunction with a coding type conveyor and gravity slides to selectively pick from the conveyor and transfer to selected bin bays and to allow return to the same conveyor with minimum lifting of the garments or other articles. The system is also deemed novel in grouping a plurality of electrically controllable vertical storage bins with a coding conveyor in a system where bin storage bar selection may be accomplished either by pushing a control button at the bin itself or by pushing a control button at a remote master console as next explained which has proven in practice to give unusual operational flexibility. This is particularly evident in handling garments where the build-up at particular bins both for loading and picking is constantly changing.

Figure 1:
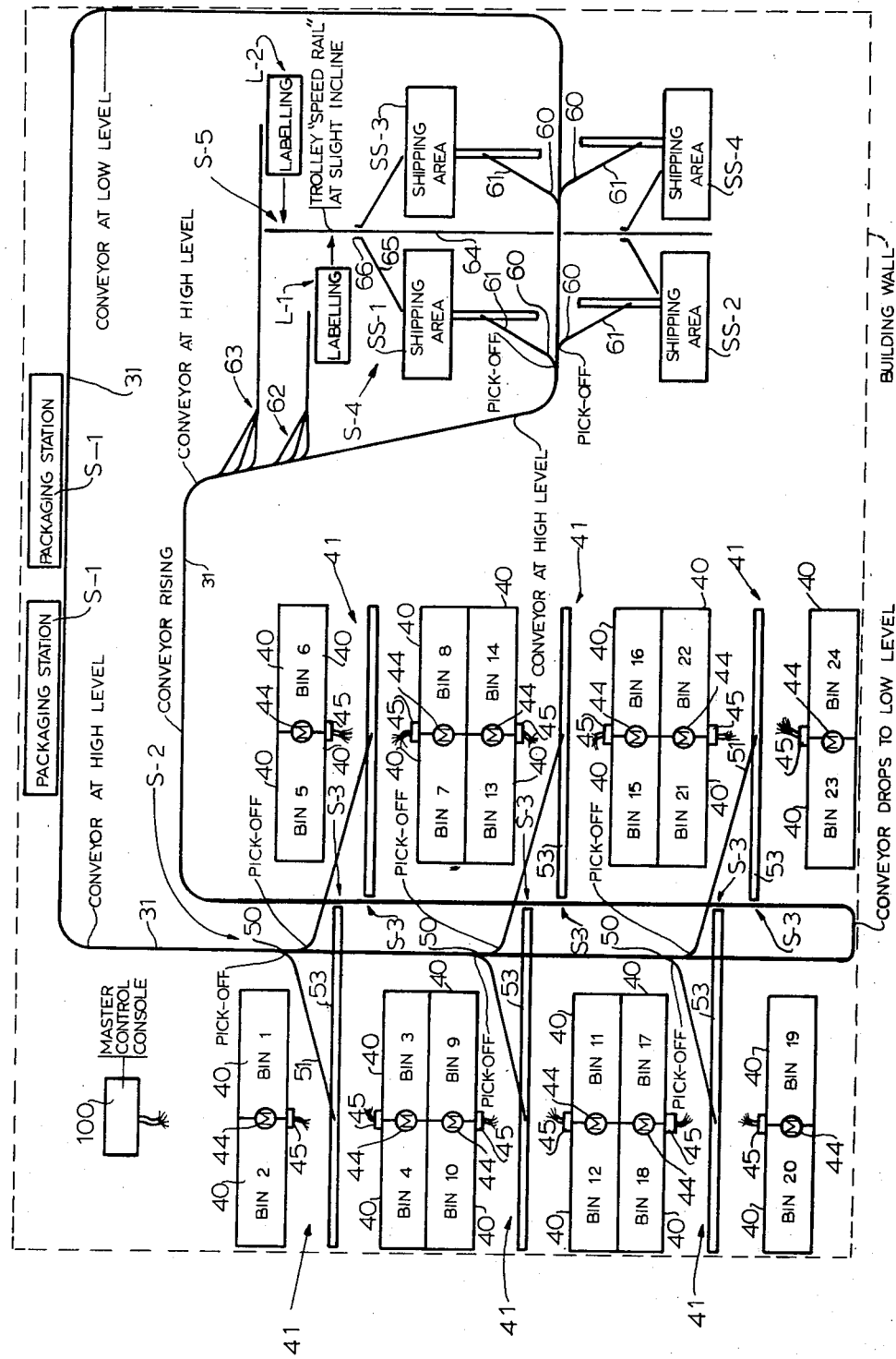
FIG. 1 is a schematic layout of the complete system as applied to garments.

The master console 100, FIGS. 1, 8 and 9, is physically located at a convenient central location proximate the storage bins as in FIG. 1. Console 100 contains sets of push button controls, FIG. 9, which duplicate the bin controls 45 located at the bin themselves and which control the bin drive motors 44. In the garment handling embodiment disclosed each pair of bins has a common drive motor 44 and is operated by a common control for reasons of economics and efficiency though it should be understood that each individual bin could have its own separate motor drive and control. In the 24 bin group illustrated there are thus 12 controls located on the bins themselves and 12 controls at the master console and the controls are interconnected. Each bin has eight garment support bars and accordingly each control at each bin pair and in the master console is arranged with eight push buttons corresponding to selecting any of the eight bars at each respective bin pair and in the master console is arranged with eight push buttons corresponding to selecting any of the eight bars at each respective bin pair. Thus, bar 2 for the bin 1 – bin 2 pair can be selected at the console 100 or at the bin control 45 located on the bins comprising the bin 1 – bin 2 pair. The general appearance of the typical bin control 45 is shown in FIG. 10 in which will be seen the eight bar selector push buttons and the stop-start buttons for deenergizing and energizing the motor for the particular bin pair.

It has previously been mentioned that selective bin bar selection is obtained by means of closing micro-switches with the adjustable cams shown in FIG. 12 and using the circuits established to actuate conventional motor stop circuitry to stop the respective motor drive simultaneous with the selected bar arriving at the loading-unloading position. Since cam controlled selector circuits of this kind are generally old as shown in the prior patents previously cited and no claim is made to the circuitry itself, it will be discussed only in sufficient detail to enable those skilled in the art to understand its general operation and to employ the same or equivalent circuitry for the purpose of the invention.

Figure 11:
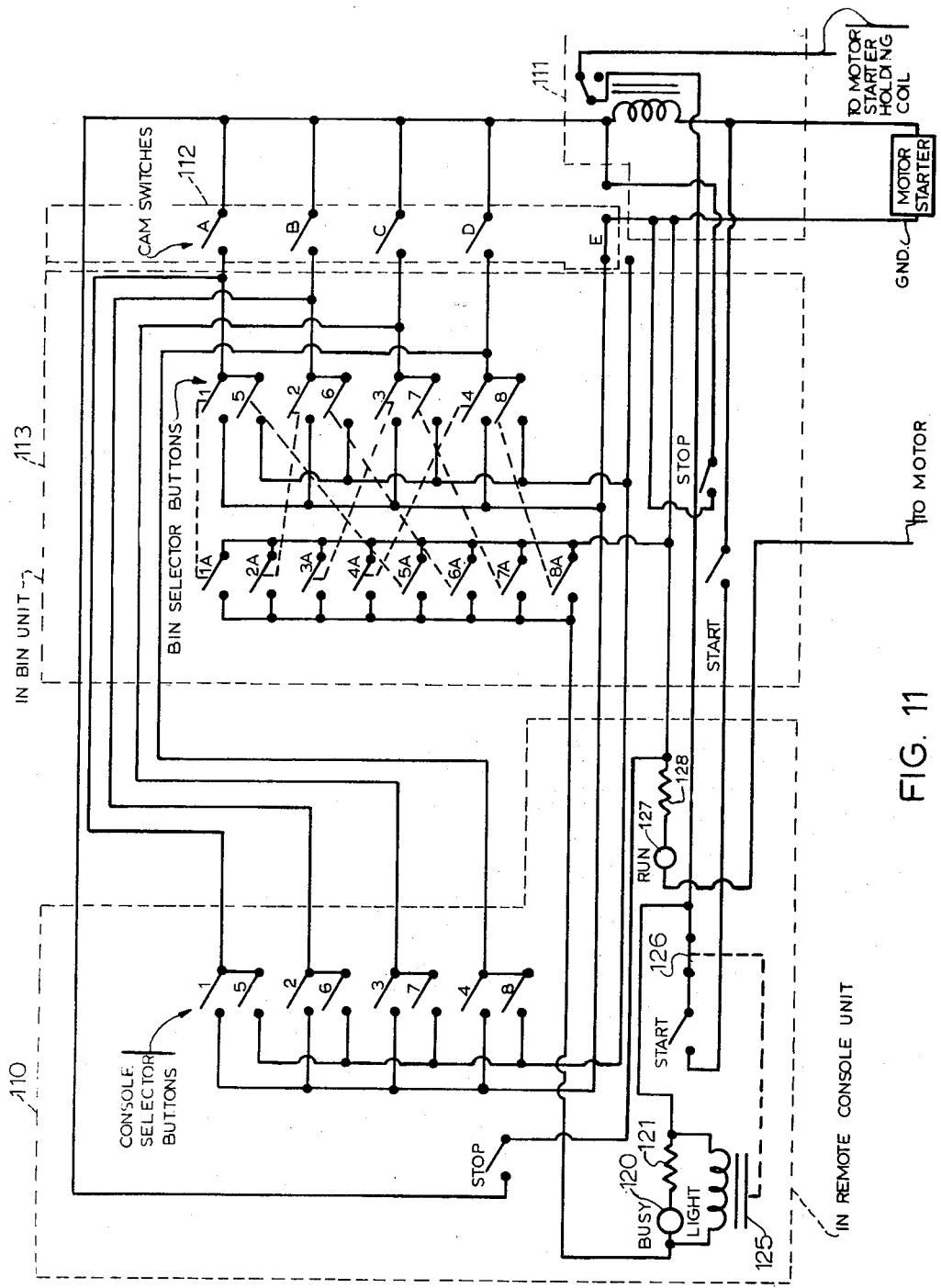
FIG. 11 is a wiring diagram of the type circuitry employed between each master console bin control and the bin control located at the bin, this circuitry being repeated for the number of bin controls in the system.

FIG. 11 illustrates the type of circuit employed between each console control and each bin control and it should be understood that 12 such circuits are employed. The circuit of FIG. 11 consists of the bin selection section 110 which is located at the remote console unit, the motor drive starter section 111 which may be in the motor junction box on the bin and the cam operated micro-switches, enclosed in dashed line box 112, which are appropriately mounted on the bin adjacent the bin chain 75 to strike and close selected micro-switches as later discussed. The remainder of the circuitry shown in the dashed line box 113, excluding the micro-switches 112, is in the bin control at the bin itself.

Looking at the right of FIG. 11, the numbers 1, 2, 3, 4, 5, 6, 7 and 8 refer to the push button numbers at the bin control 45 and which also appear as in FIG. 10. The same numbers 1 through 8 are seen in the left of FIG. 11 and refer to the numbers of the corresponding push buttons on the console unit shown in FIG. 9. The labels A, B, C, D and E designate the micro-switches which are closed when selectively engaged by the discs or cams 92 shown in FIG. 12. It will also be noted on the right of FIG. 11 that contacts 1A through 8A are mechanically connected to corresponding push buttons 1 through 8, indicated by dash line connections.

The push buttons on both the remote and bin units are also provided with a mechanical interlock so that slight pushing in of a new button releases and clears any prior engaged button. A double pole, double throw type switch with the interlocking feature suited to the circuit of FIG. 11 may be obtained from various sources, one suitable switch being made by Switchcraft, Inc. of Chicago, Illinois 60630 and termed a DW Multi-Switch.

The chain cam which operates micro-switch A may be thought of as cam A, for micro-switch B as cam B etc. The cams are arranged so that bin bar 1 corresponds to A cam, bar 2 to B cam, bar 3 to C cam, bar 4 to D cam, bar 5 to AE cams, bar 6 to BE cams, bar 7 to CE cams and bar 8 to DE cams. Using the bin control for bins 1 and 2 as an example, it should be understood that if the operator pushes button 1 on either the console control for the bin pair 1-2 or the control 45 located on the bin pair 1-2, corresponding circuitry of FIG. 11 will be established and when the operator pushes the "start" button at the bin or at the console the conveyor chain 75 for bins 1 and 2 will rotate until cam A closes micro-switch A and operates the motor stop circuitry. This will coincide with bar 1 on bins 1 and 2 arriving at the proper loading-unloading position.

It is contemplated as previously mentioned that bin selections may sometimes take place at the bins themselves and at other times at the master console. At the master console the operator, of course, has the advantage of being able to select over all the bins simultaneously. In order to warn an operator at the master console whenever another operator at a bin has selected a particular bin pair by local bin control there is provided a warning light 120 which operates through a suitable resistor 121 and which when energized operates relay 125 and opens contacts 126 thus positively preventing remote operation. As an additional safety precaution a "run" light 127 is energized through resistor 128 whenever the respective bin motor 44 is running.

"Start-stop" buttons are provided on both the bin and master controls as shown and following selection and pushing of the appropriate "start" button the particular bin pair control will of course automatically bring a selected bar into position and shut down. The "stop" buttons shown provide a means for stopping the selected motor 44 at any time even though it may not have brought the bar to its selected position whereas the cam actuated micro-switches effectively short circuit and work the same as the stop circuit.

To summarize the invention as applied to handling garments, it will be seen that a common coding type conveyor is used to initially receive the finished and packaged garments, then to elevate the coded garments and then to bring them to a first picking station located among a plurality of such stations. At this first station various classifications are picked-off and slid by gravity to vertical storage bin groups with each bin group and each support rod in each bin being conveniently arranged to receive particular classes of garment. Temporary accumulation and storage, basic requirements in any large garment handling operation, may thus take place both between the conveyor and the bins as well as in the bins. For filling orders the vertical bin storage system of the invention allows the garments to be picked from the bins by order needs and returned to the same conveyor by sliding, with minimum lifting and walking. The coding capability of the conveyor is now employed for coding according to labelling or shipping rather than according to bin storage as at the second station. The garments now again move to a relatively high level to the labelling or shipping station, where they, selectively, are picked-off according to shipping station and guided by gravity to such station or according to labelling and following labelling guided to shipping.

It can thus be seen that substantial space is saved as compared to the conventional practice of hanging finished and packaged garments on fixed bars usually at one or at the most two levels. Furthermore, operator walking and lifting is reduced to a minimum once the garments are introduced into the system. The operator may be required to service several bin groups and walk between such groups but his lifting is always limited to lifting the short distances between the return bar and the bin support rods and between the return bar and the conveyor. High roof buildings may be efficiently employed with bin members, because of the relatively light garment load, serving both as bin structural members as well as building structural members. Equally important to a large non-uniform garment handling operation the system of the invention provides many points for accumulation of garments including the conveyor itself, the picking, guide and return bars and the bin support rods. Thus, there is no tendency for the garments to stack up at any one point and in the event one storage area becomes overloaded all that is required is to recode the garments at the first station.

In summarizing other aspects of the system of the invention, it will be noted that for the first time in the use of vertical bin storage, groups of such bins have been brought into a collective storage system selectively accessible by conveyor-gravity slide and providing bin selection both at the bin site and at a common remote master console unit. Thus, a single operator as well as teams of operators are given maximum flexibility in selecting among groups of vertical bins and in transferring and removing garments from the bins with minimum physical labor. Tremendous quantities of garments may be kept in useful transport motions.

Of special significance is the fact that the system and method of the invention is uniquely suited to minimizing inventory in the common situation in which the manufacturer makes some garments exclusively under one and only one label and other non-exclusive garments which though identical in construction may bear any of several customer labels when shipped. Exclusive labelled garments are best labelled prior to bin storage since no material saving is achieved by deferring labelling until picked for an order. However, it can be seen that if a manufacturer stores the same identical non-exclusive garment in large quantities and labels such garments prior to storage the garments cannot be used except for specific customer orders associated with specific labels. Furthermore, such labelled, non-exclusive garments inherently involve tremendous inventory costs since the manufacturer always wants to have certain minimum quantities on hand for each customer in order to give quick delivery on orders. The system and method of the invention deals with this problem as previously explained by allowing both exclusive label and non-exclusive label garments to flow through the system. When orders are to be filled the picked garments if under exclusive label can be coded for a shipping station and conveyed direct to a selected shipping station. However, if the order calls for non-exclusive label garments the picking operator codes the garments for a labelling station and after labelling the labelling operator transfers the garments to shipping. From this it can be seen that many customers for non-exclusive label garments can be serviced from a common stock and the amount of such stock needs to be held only at the total daily quantity required for all of such customers.

Figure 15:
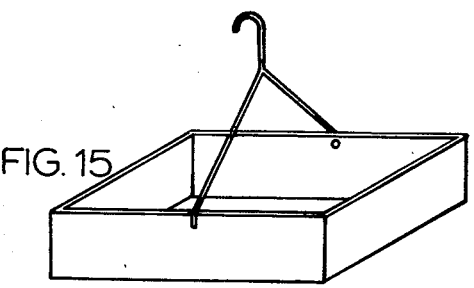
FIG. 15 is a perspective view of a garment receiving receptacle used for transporting folded garments to the storage bays.

While the embodiment described is deemed most suitable for unfolded garments in the nature of coats, dresses and the like the system is equally adapted to many other types of non-uniform articles requiring conveying and segregating such as is involved in handling folded garments. This is illustrated in FIG. 15 where a coded pan for holding folded garments is shown and in FIGS. 16 and 17 where shelves are shown which are adapted for use in the vertical storage bin for receiving folded garments. Coding and handling of such folded garments of course follow the general description previously set forth. While not shown in detail, the system may also handle textile piece goods which arrive in bolts. In transporting the individual bolts of material to the vertical storage, the bolts are suspended from conveyor 31 by pivotal hooks at both ends. These hooks are in turn placed upon a numbered hook of the Railex type conveyor. As the conveyor 31 moves the bolt along, the first hook is engaged by a pick-off and starts to slide down the inclined take-off. As the second hook reaches the same pick-off point, it too is picked-off and the hooks and bolt slide downward and the bolt may thereafter be handled in the manner already explained.

Various other articles such as automobile tires and non-uniform boxed goods may be suspended and coded on the conveyor and handled by the system in the manner explained. Thus, the handling of garments is to be taken only as one example of use of the invention. Furthermore, it can be seen that the gravity picking and slide bar means may take somewhat different form and still obtain the benefit of eliminating, as does the invention, operator walking transport of the articles. Where the words "slide" or "sliding" are employed in the claims it is meant to include both the form of moving hanger hung articles where the hanger literally slides on a bar or the like as well as the form in which the hangers are transported on auxiliary short bars which slide or roll on a bar. The well known "speed rail" is of the latter type.

The picking and loading levels are not necessarily tied to high and low elevations since it is apparent that once the items are picked a very minor difference in elevation would allow the advantages of the invention to be obtained. Further, it will be apparent that the intermediate step of placing the articles on a storage bar after removing them from the bin and before returning them to the conveyor may be eliminated. That is, it is apparent that the benefits of the invention can be obtained irrespective of whether the operator does or does not place the articles on a storage bar before putting them back on the conveyor.

In summary it is apparent that when applicant's disclosure is compared against the art of record that applicant is the first to provide a closed loop conveyor having a first loading station at an appropriate loading level, a second picking station at an appropriate picking level, guide bar means between the picking station and a lower unloading level adjacent vertical chain type storage bins, a lower run of the same conveyor accessible to the bins for reloading and recoding on the same conveyor and a final station at a picking level with additional picking and guide bar means. As previously mentioned, the differences in picking and unloading levels may be relatively small and still effect gravity sliding. Furthermore, the slide bar 53 may be eliminated and articles reloaded directly on the conveyor without intermediate storing and sliding on a return bar such as bar 53.

It should also be noted from the description and drawings that the invention is novel in providing a conveyor which provides for loading at one station, provides for picking at another station adjacent a group of vertical type storage bins, provides for reloading at another station near the bins and then provides for picking at a final station. Thus, the system of the invention may be utilized with both uniform and non-uniform articles and with non-coding conveyors as well as coding conveyors. Also, the system adapts to the article carriers and the bin support means being something other than clothes hangers and support rods.

What is claimed is:

1. A continuous flow method for handling hanger hung articles between work stations, comprising the steps:
   a. at a first station coding and installing the articles by their hangers on a continuously moving coding type loop conveyor and in a continuous flow;
   b. moving the coded articles by the conveyor to a first picking level and past first plural picking points, each first picking point being adapted to pick off the conveyor and group specific coded articles;
   c. sliding the picked articles on first slide bars from each respective first picking point to respective storage bar positions and accumulating the respective groups of articles on respective slide bars;
   d. transferring the articles from the storage bar positions to vertical bins having their bases located immediately adjacent work aisles mounting respective storage bar positions and being of the type having endless chain mounted electrically selective hanger support bars within substantially high vertical storage chambers and within each respective bin accumulating and storing the article groups on selected hanger support bars;
   e. in coordination with requirements at a second station transferring selected article groups from the respective bins to a lower level run of said conveyor and coding and installing the selected articles by their hangers onto said conveyor and according to selected points at said second station;
   f. moving the coded articles by the conveyor to a second picking level and past second plural picking points, each second picking point being adapted to pick off the conveyor and group specific coded articles according to a selected second station point; and
   g. sliding the picked garments on second slide bars from each respective second picking point to respective second station storage points and accumulating the articles on respective said second slide bars pending removal.

2. A system for handling non-uniform articles between work stations, comprising in combination:
   a. a continuously moving chain type coding conveyor forming a closed loop going past selected loading and picking stations, said conveyor at each loading station being at a level adapted to loading and at each picking station at a level adapted to picking and being adapted to code and support said articles;
   b. a plurality of endless carrier vertical type storage bins each having within a vertical chamber plural spaced support rods adapted to support and temporarily store substantial quantities of said articles and positioned by bin groups, each group having a working aisle immediately adjacent thereto and electrical drive control means for bringing selected bin rods to a selected uniform loading-unloading position accessible to an operator standing in said aisle;
   c. first picking and guide bar means for each bin group adapted to selectively pick coded articles from a respective conveyor picking station level and guide said articles by sliding to a temporary storage position proximate a selected said aisle and proximate a selected said bin rod loading-unloading position thereby enabling said articles to be transferred from said picking and guide bar means to a selected said bin rod with substantially no operator walking transport of the articles;
   d. said conveyor having a loading station proximate said bin rod loading-unloading position enabling said articles to be transferred from the respective bin group rods to and recoded on the same said conveyor for the final station; and
   e. second picking and guide bar means at said final station adapted to selectively pick said recoded articles from a respective conveyor picking station level and guide the picked articles to selected unloading positions at said final station.

3. A system for handling articles between work stations, comprising in combination:
   a. a continuously moving conveyor forming a closed loop going past selected loading and picking stations, said conveyor at each loading station being at a level adapted to loading and at each picking station at a level adapted to picking and being adapted to receive and support said articles on individual carriers;
   b. a plurality of endless carrier vertical type storage bins each having within a vertical chamber plural spaced support means adapted to support and temporarily store substantial quantities of said articles on the respective article carriers and positioned by bin groups, each group having a working aisle immediately adjacent thereto and electrical drive control means for bringing selected bin support means to a selected uniform loading-unloading position accessible to an operator standing in said aisle;
   c. first picking and guide bar means for each bin group adapted to selectively pick articles on the respective carriers from a respective conveyor picking station level and guide said articles on such carriers by sliding to a temporary storage position proximate a selected said aisle and proximate a selected said bin support means loading-unloading position thereby enabling said articles on their respective carriers to be transferred from said picking and guide bar means to a selected said bin support means with substantially no operator walking transport of the articles;
   d. said conveyor having a loading station proximate said bin support means loading-unloading position enabling said articles on the respective carriers to be transferred from the respective bin group support means to and be loaded on the same said conveyor for the final station; and
   e. second picking and guide bar means at said final station adapted to selectively pick said reloaded articles on their respective carriers from a respective conveyor picking station level and guide the picked articles on their carriers to selected unloading positions at said final station.

4. A system as claimed in claim 3 wherein said articles are non-uniform textile articles, said support means constitute bin support rods and said article carriers constitute carriers.

* * * * *